No. 627,791. Patented June 27, 1899.
G. ZEIDLER.
CALCULATING MACHINE.
(Application filed Aug. 6, 1894.)
(No Model.) 5 Sheets—Sheet 1.

No. 627,791. Patented June 27, 1899.
G. ZEIDLER.
CALCULATING MACHINE.
(Application filed Aug. 6, 1894.)
(No Model.) 5 Sheets—Sheet 3.

WITNESSES:
INVENTOR
Gustav Zeidler
BY
ATTORNEYS.

No. 627,791. Patented June 27, 1899.
G. ZEIDLER.
CALCULATING MACHINE.
(Application filed Aug. 6, 1894.)
(No Model.) 5 Sheets—Sheet 4.

WITNESSES:
INVENTOR
BY
ATTORNEYS.

No. 627,791. Patented June 27, 1899.
G. ZEIDLER.
CALCULATING MACHINE.
(Application filed Aug. 6, 1894.)
(No Model.) 5 Sheets—Sheet 5.

UNITED STATES PATENT OFFICE.

GUSTAV ZEIDLER, OF NEW YORK, N. Y.

CALCULATING-MACHINE.

SPECIFICATION forming part of Letters Patent No. 627,791, dated June 27, 1899.

Application filed August 6, 1894. Serial No. 519,524. (No model.)

*To all whom it may concern:*

Be it known that I, GUSTAV ZEIDLER, a citizen of the United States, residing in the city, county, and State of New York, have invented certain new and useful Improvements in Calculating-Machines, of which the following is a specification.

This invention relates to an improved calculating-machine by which the different arithmetical operations can be performed by mechanical means, so as to dispense with the mental work required in performing these operations and to enable any one, if he only knows the rudiments of arithmetic, to perform the different operations in as quick and reliable a manner as a skilled arithmetician. For this purpose my invention consists of a calculating-machine which comprises a series of actuating-keys arranged in rows or groups, a shaft, key-levers mounted at their inner ends on said shaft and extending along and in contact with the under side of the top part of the casing and adapted to be depressed by said keys, said key-levers each consisting of a short section connected with the shaft and a longer section pivoted to said short section, said sections being provided at their adjacent pivoted ends with stop-shoulders, which abut when the sections of the levers are in line with each other, toothed segments applied to the short sections of said key-levers at opposite sides of the fulcrums of the same, a series of numbering-wheels, and carrying mechanism arranged between each numbering-wheel and the key-lever of the next higher numbering-wheel. A carrying mechanism is arranged between the numbering-wheels, so as to carry over the tens, hundreds, &c., to the next following wheel. Each numbering-wheel is provided with two circumferential series of numbers, one being arranged in one direction and the other in the opposite direction, so that they can be used for addition and subtraction and, in connection with separate mechanisms, for multiplication and division. A shiftable face-plate having openings for the figures on the numbering-wheels is moved in lateral direction by means of an eccentric, so as to be set for addition and subtraction, while for multiplication and division the movable rear part of the machine and the operating parts in the same are shifted forward by a strap connecting the rear part with the spindle of the eccentric. A common transverse bar is provided in connection with the pivoted and spring-actuated key-levers, actuating-bars, and retaining-stops for returning all the numbering-wheels to the initial point after an arithmetical operation is performed. At the rear of the numbering-wheels are arranged a number of actuating-wheels provided with pivoted and spring-locked teeth, which are adapted to be set radially in line with the body of the wheel or at right angles thereto and arranged to be placed in mesh with the spur-wheels on the numbering-wheels, so as to be used for multiplication or division in connection with a suitable rotating mechanism and with suitable indicating-disks placed in mesh with each other and with the driving mechanism.

The invention consists, further, of certain details in the construction of the numbering-wheels and their actuating, carrying, arresting, and returning mechanisms; also, in certain details of construction in the device by which multiplication or division is performed by the numbering-wheels in connection with the toothed multiplying-wheels and the indicating-disks, as will be fully described hereinafter and finally pointed out in the claims.

In the accompanying drawings, Fig. 2 is also a top view, the top plate and the actuating-keys being removed and other parts in section. Fig. 3 is also a top view of the rear part of the machine, showing parts broken away and the cover carrying the indicating-disks moved to one side, so as to show the gear-wheels by which multiplication or division is performed. Fig. 4 is a vertical transverse section on line 4 4, Fig. 6. Fig. 8 is a vertical transverse section on line 8 8, Fig. 5. Fig. 9 is a bottom view of the indicating-disks and their transmitting mechanisms, and Fig. 10 is a detail sectional side elevation of the mechanism for returning the numbering-wheels to zero and arresting them in this position.

Similar letters of reference indicate corresponding parts.

My improved calculating-machine is composed of a step-shaped casing A, at the front part of which the keys K are arranged, while the mechanisms by which the different arithmetical operations are performed are located in the higher rear part of the casing. A portion A' of the rear part of the casing is made shiftable, so as to be adjusted either backward or forward, it being guided by means of dovetailed rails $a$ in correspondingly-shaped ways $a'$, which latter are supported on the bottom of the casing. The rails $a$ are acted upon by helical springs $a^2$, by which the operation of shifting the rear part A' in outward direction is assisted. The top plate of the movable rear part A' is connected by means of a longitudinal strap $A^3$ with the spindle $e$ of an eccentric E, which spindle turns in bearings of said top plate of the casing and is provided with a knob or button $e'$ at its upper end, by which the spindle $e$ may be taken hold of and set into either one of two holes $e^2$ in the top plate, so that the connecting-strap $A^3$ may be moved forward or backward and the rear part A' of the casing and the parts supported in the same shifted and adjusted in forward or backward direction for the purposes which will be hereinafter described. The recessed ends of the side walls of the rear part A' are guided in the recessed ends of the side walls of the front part, as shown in Fig. 2, the extent of shifting motion of the rear part A' being within certain limits.

Figure 1:
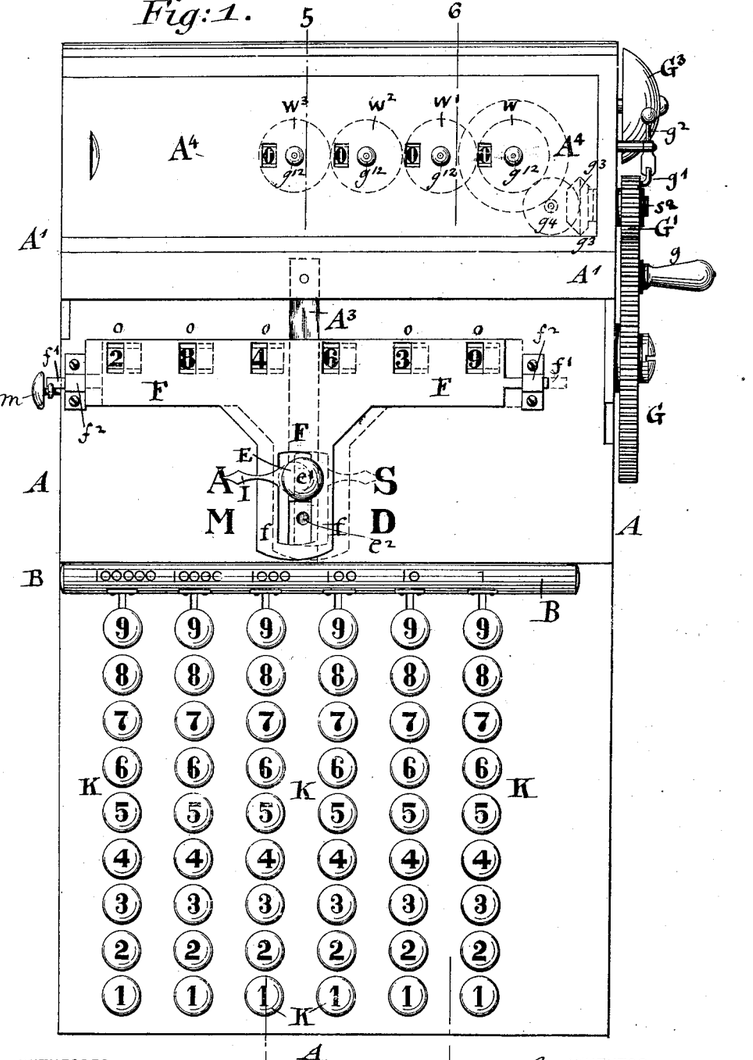
Figure 1 represents a top view of my improved calculating-machine.
Figure 5:
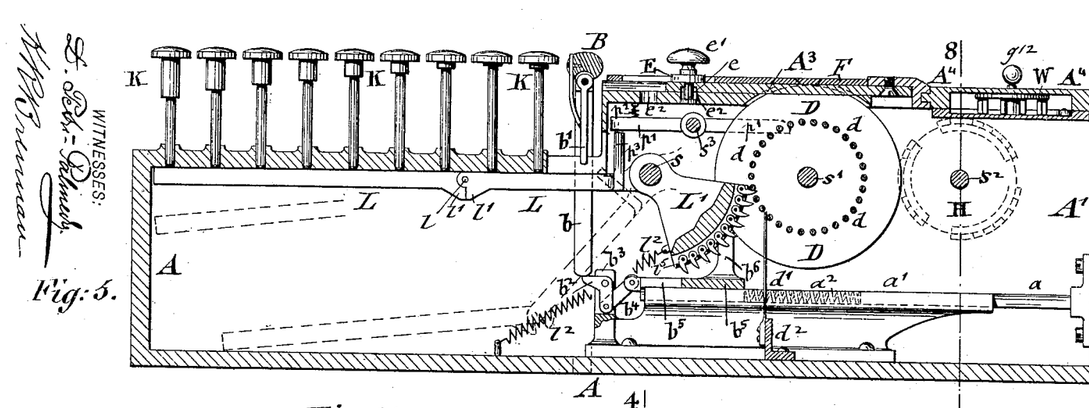
Fig. 5 is a vertical longitudinal section on line 5 5, Figs. 1 and 2.

On the lower front part of the casing A are arranged as many groups of keys K as there are numbering-wheels to be arranged in the machine. When six numbering-wheels are arranged, six groups of keys have to be provided, as shown in Fig. 1, each group consisting of nine keys, which are consecutively numbered, commencing with "1" at the outermost key and running up to "9" at the innermost key. The first line or group of keys operates the units numbering-wheel, the second the tens-wheel, the third the hundreds-wheel, the fourth the thousands-wheel, &c. The shank of each key is guided in holes of the top plate of the casing A, said keys being provided in the shank with sleeves of varying lengths below their knobs, as seen in Fig. 5, for limiting the extent of depression of the keys and producing by the greater or smaller lengths of sleeves the smaller or greater depth to which the keys are depressed. Below each line or group of keys K is arranged a key-lever L, on which the shanks of the keys rest and which turns loosely on a fixed transverse shaft $s$, which is attached to the side walls of the casing A. Each key-lever L is preferably made of two parts, which are pivoted together about midway, or nearly so, and provided with shoulders $l'$ below the pivot $l$. This jointing of the key-levers L has for its object to reduce the sweep or oscillating motion of the key-levers L without requiring a too great depth of the front part of the casing, as by this arrangement the parts of the key-levers can be set at any suitable angle toward each other, as shown in dotted lines in Fig. 5. By the stop-shoulders arranged below the pivot of each key-lever the front end of each key-lever can be depressed with the same facility as the opposite end, the jointed parts acting toward the keys above the same by means of the pivot-and-shoulder connection in the same manner as a rigid key-lever. Each key-lever L is provided at its rear end with a toothed segment L', the hub of said segment being preferably made in one piece with the rear portion of the key-lever, it being acted upon by a helical spring $l^2$, which is connected at one end to the toothed segment L' and at its lower end to the bottom of the casing, as shown in Fig. 5. The arc-shaped edge of each segment L' is grooved and provided with ten pivoted and projecting teeth $l^4$, that are straight at one side and curved at the opposite side, and with stop-pins $l^5$ back of each tooth, said teeth serving to engage the teeth of a pin or spur wheel $d$, that is applied to one side of the numbering-wheels D when the segment is moved in one direction and to clear said teeth when the segment is moved in the opposite direction. The numbering-wheels D are placed loosely on their shaft $s'$ and are turned only during the upward motion of the segments, while during the return motion of the segments the pivoted teeth of the same pass over the pins or teeth of the wheels $d$ without affecting the numbering-wheels. A flat spring $d'$ acts on the pins or spurs of each wheel $d$, the lower end of said spring being attached to a stationary bracket $d^2$, attached to the bottom of the casing A. This spring serves to prevent the overrotation of the numbering-wheels D and serves also by entering between two adjacent pins or spurs as a check device for preventing the turning of the numbering-wheel in a direction opposite to its ordinary direction of rotation. The shaft $s'$, on which the numbering-wheels D are loosely placed, is, like the shaft $s$, attached stationarily to the side walls of the casing A. By gradually diminishing the size of the sleeves on the shanks of the key-levers according to the extent of motion that is to be imparted to the key-lever of each line or group of keys K the required degree of rotating motion is imparted by the toothed segment to the numbering-wheels, so that the distance to which it is rotated corresponds to the proportionate depression of the key.

Each numbering-wheel D is provided on its periphery with two rows of figures running from "0" to "9," the "0" of one row standing beside the "9" of the other row, so that the sum of any two numerals standing side by side in the two rows is nine. The figures run from "0" to "9;" but preferably a multiple of those figures are arranged in the drawings, three sets being arranged on the circumference of each numbering-wheel, so that the number of rotations of the wheels is diminished and overrotation diminished, while by the two-columnar arrangement of the three sets of figures the same numbering-wheels can be used for all four arithmetical operations—namely, addition, subtraction, multiplication, and division—as will be described more in detail hereinafter. The pin or spur wheel $d$ at one side of each numbering-wheel D is provided with as many spurs or pins as there are figures in each column arranged on the circumference of the wheel, while the intermeshing segment is arranged with ten teeth, so that each full stroke of the toothed segment will turn the numbering-wheel for one-third of a rotation, as the uppermost teeth are always in engagement with the pins or spurs of the spur-wheels $d$.

For the purpose of carrying over tens, hundreds, &c., from one wheel to the adjacent wheel a carrying mechanism is employed, which consists of three pins $p$, that are arranged equidistantly from each other on the side opposite to that on which the spur-wheels $d$ are located. The pins $p$ engage levers $p'$, that are fulcrumed loosely to a fixed shaft $s^3$ and the front ends of which are pressed in downward direction by helical springs $p^2$, interposed between the top plate of the casing and the front end of the fulcrumed lever. The pins $p$ act on the rear ends of the fulcrumed levers, while the front ends act on angular pins $p^3$, that extend at right angles from the next adjacent key-lever L to the left, as shown clearly in Figs. 2 and 5, so that if by the actuation of a key its corresponding key-lever and segment are moved for such a distance that one of its pins $p$ engages the intermediate lever $p'$ the next adjacent key-lever to the left is depressed to such an extent that its segment moves thereby the tens, hundreds, &c., or other numbering-wheel for the distance of one figure, or, in other words, the adjacent key-lever and its segment are operated in the same way as though they were actuated by the key numbered "1" of the corresponding line or group. By this arrangement a very reliable carrying mechanism is obtained by which the unreliable ratchet-and-pawl mechanisms heretofore used in cash-registering and other counting machines are dispensed with.

Whenever it is necessary to perform a new arithmetical operation, it is necessary that all the numbering-wheels be returned to zero. A separate returning mechanism is provided for this purpose, which consists of a transverse bar B, that is preferably arranged adjacent to the innermost keys numbered "9" of the different groups, as shown in Fig. 1, said bar being preferably provided with the indicating-numbers "1," "10," "100," "1,000," "10,000," "100,000," &c., respectively, in line with the units, tens, hundreds, &c., groups of keys K, so as to furnish thereby the denomination of the lines or groups of keys, said figures being also approximately in line with the figures of the numbering-wheels and with the figures on the indicating-disks W, W', $W^2$, and $W^3$, hereinafter to be described, as shown clearly in Fig. 1. The bar is provided at each end with a downwardly-extending shank $b$ and intermediately between the shanks with pivoted and spring-actuated pushers $b'$, as shown in Fig. 5 and in detail in Fig. 10. The pivoted and spring-actuated pushers $b'$ are somewhat shorter than the distance between the bar B and the key-levers L, upon which they are intended to operate, for the purpose that the vertical shank $b$ can actuate the arresting mechanism of the numbering-wheels slightly in advance of the actuation of the key-levers by the pushers $b'$. The lower ends of the shanks $b$ engage the upper ends of bell-crank levers $b^2$, which are fulcrumed to upright lugs $b^3$, attached to the bottom of the casing. The lower arms of the bell-crank levers are further connected by intermediate pivot-links $b^4$ with a transverse base $b^5$, on which as many arresting-brackets $b^6$ are arranged as there are numbering-wheels D. The transverse base $b^5$ is guided by dovetail guides at its ends in the dovetailed front ends of the ways $a'$.

Each arresting-bracket $b^6$ is provided at its upper end with a horizontal finger $b^7$, that is moved by the shanks $b$ and the intermediate mechanism in backward direction, as shown in Figs. 5 and 10, so that the horizontal finger $b^7$ is moved over one of the projecting pins $p$ of the numbering-wheel D. Almost simultaneously therewith all the key-levers L are depressed by the pushers $b'$ and the toothed segments L' oscillated, so that all the numbering-wheels D are turned on their shaft or axle $s'$ until one of the pins $p$ of each numbering-wheel D abuts against a backwardly-shifted arresting-finger $b^7$, whereby the numbering-wheels are stopped at zero. As the transverse bar B, with its pushers, is depressed by hand the same acts on all the key-levers simultaneously, and as the numbering-wheels are in different relative positions regarding their zero-points the pivoted push-pins $b'$ must yield and move into inclined positions on the key-levers L, as shown in Fig. 10, so as to produce thereby the greater or smaller oscillations of the key-levers and their segments, according as the corresponding numbering-wheels require a greater or smaller rotation on their axle for bringing their nearest pins against the arresting-fingers $b^7$, and thereby the numbering-wheels back to the zero-points. Whenever one of the pins $p$ abuts against the arresting-finger $b^7$, the axial rotation of the numbering-wheel is arrested, and the zero-point corresponding to the pin arrested appears below the aperture in the top plate. By this mechanism the transverse bar B produces the positive returning of all the numbering-wheels to zero in a very effective and reliable manner. The helical springs $a^2$, which act on the guide-rails $a'$ of the rear part $A'$ of the casing, also act on the dovetailed guide-piece of the base $b^5$ of the arresting-fingers $b^7$ and serve thereby to return the transverse bar B, shanks $b$, and push-pins $b'$ and the intermediate mechanisms into their former positions. This return motion is further assisted by the helical springs $l^2$, connected with the toothed segments $L'$, by which the key-levers L and keys are returned into their normal positions.

On the top of the rear part of the casing A is arranged a laterally-shifting face-plate F. This face-plate is provided with a central slotted shank $f$, which engages the eccentric E, the slot being of sufficient width as to provide for the diameter of the eccentric, while the length of the slot provides for the shifting of the rear part $A'$ of the casing by means of the connecting-strap $A^3$. The ends of the face-plate F are provided with lugs $f'$, which are guided in keepers $f^2$ on the top of the casing A, said lugs and keepers serving for guiding the face-plate F when the same is shifted by turning the eccentric by its knob or button $e'$. The face-plate F can thereby be shifted in lateral direction from the position shown in full lines to that shown in dotted lines in Fig. 1. The rear part $A'$ of the casing is shifted forward and backward relatively to the face-plate F by lifting the spindle $e$ of the eccentric E and the connecting-strap $A^3$ and placing then the spindle $e$ into the next hole $e^2$ in the top of the casing A, as shown in Fig. 5. On the top of the casing A and at each side of the slotted shank $f$ of the face-plate F are arranged the initial letters of the different arithmetical operations—namely, at the left-hand side the capital letters "A" for addition and below the same "M" for multiplication and at the right-hand side "S" for subtraction and "D" for division. By turning the eccentric on its axis for shifting the face-plate F the index I is brought either from the letter "A" to "S" or from "M" to "D," according as the face-plate is to be set for addition or subtraction or for multiplication or division. The face-plate F is provided with as many apertures $o$ as there are numbering-wheels, said apertures being large enough to permit the reading off the figures of one circumferential row of columns on each numbering-wheel, they being placed for addition or multiplication over the left-hand row of figures, while for subtraction and division the apertures are placed over the right-hand row of figures on the circumference of the numbering-wheels.

The parts mounted in the shiftable rear part $A'$ and used in multiplying and dividing are as follows: In the movable rear part of the casing A is arranged a shaft $s^2$, which is not fixed, but supported in bearings of the side walls of the rear part $A'$ and adapted to be rotated by a pinion $G'$ and a large gear-wheel G, the hub of which is applied to a short shaft attached to the side wall of the rear part $A'$. The gear-wheel G meshes with the pinion $G'$ and is turned by a handle $g$ when it is desired to impart rotary motion to the shaft $s^2$. The pinion $G'$ is provided with a finger $g'$, that engages the hammer or striker $g^2$ of a bell $G^3$, which is applied to a post attached to the rear part of the casing. This bell is struck at each full rotation of the pinion $G'$, so that the number of rotations of the pinion can be readily counted. With each rotation of the pinion the shaft $s^3$ is turned on its axis and the number of its rotations is registered on a series of indicating-disks W, which carry the figures "0" to "9" and which are arranged in a laterally-sliding cover $A^4$, that is guided transversely in ways at the top of the rear part of the casing A. The indicating-disks W are operated by means of two intermediate bevel-wheels $g^3$ $g^4$, of which the bevel-wheel $g^3$ is keyed to the shaft $s^2$, while the bevel-wheel $g^4$ is keyed to a short vertical shaft $s^4$, which turns in bearings attached to the under side of the cover $A^4$ and which carries a pinion $g^5$ at its upper end, which meshes with a gear-wheel $g^6$. On the shaft of the gear-wheel $g^6$ is an indicating-disk W, which carries a finger $g^7$, that engages the teeth of an indicating-disk W'. This disk engages again by a finger $g^8$ the teeth of a second indicating-disk $W^2$, which has a finger $g^9$, that engages a third indicating-disk $W^3$, and so on. The number of indicating-disks W W' $W^2$, &c., corresponds to the extent of the operations of multiplication and division desired to be performed on the machine. The teeth of each indicating-disk W are engaged by spring-actuated check-pawls $g^{10}$, that engage the spurs or pins of the indicating-disks and permit the turning of the same for the distance of one spur, after which the check-pawl $g^{10}$ is moved by its spring against its stop-pin $g^{11}$, as shown in Fig. 9. Thus the check-pawls serve not only for regulating and controlling the step-by-step rotations of the indicating-disks, but prevent also their rotation in a direction opposite to the one required. The shafts of the indicating-disks W are provided at the upper end outside of the cover $A^4$ with buttons $g^{12}$ for turning the same and setting them until the figure "0" appears through the openings O' of the cover. On the shaft $s^2$ are arranged a number of actuating-wheels H, of which any desired number may be arranged. Each actuating-wheel H is constructed of a disk-shaped body $h$, provided with a circumferential groove and three groups of nine teeth $h'$ each, which are centrally pivoted to a circumferential wire $h^2$, arranged in said groove, and which are acted upon at one end or heel by a radially-split section of a spring-plate $h^3$, attached to one side of the body of the actuating-wheel, while the opposite ends of the teeth are rounded off, by which arrangement any number of teeth of one group on the different actuating-wheels H can either be set so as to extend in a position radially to the body of the wheels or at right angles thereto, as shown in Figs. 2 and 8. The teeth $h'$ have to be set into the desired position by the operator, so as to perform their proper function. The actuating-wheels H are keyed to the shaft $s^2$, so as to rotate therewith. As long as the rear part of the casing is held in backward direction by the pressure of the helical springs $a^2$ acting on the ends of guide-rails $a$ the actuating-wheels H and their oscillating teeth are not in mesh with the spur-wheels $d$ on the numbering-wheels D, with which spur-wheels they are placed in line, as seen in Figs. 2 and 5.

Figure 6:
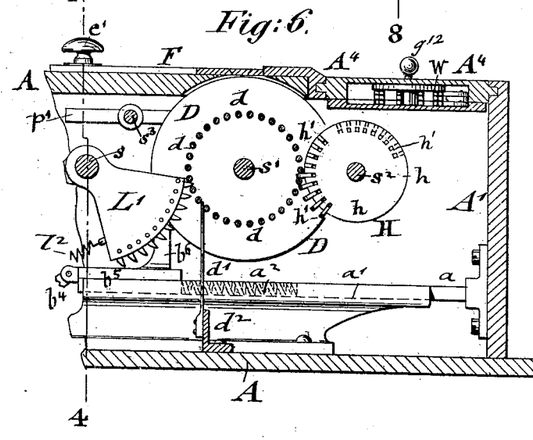
Fig. 6 is a vertical longitudinal section on line 6 6, Figs. 1 and 2.
Figure 7:
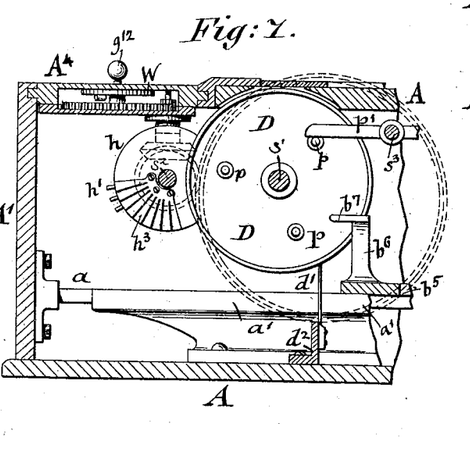
Fig. 7 is a like section showing the parts shown in Fig. 6 from the opposite side.

When the rear part A' is moved forward by taking hold of the knob or button on the spindle $e$ of the eccentric E, the connecting-strap $A^3$ shifts it against the tension of the springs $a^2$, so that the index I on the spindle of the eccentric can be placed either toward the letter "M" or "D." The spindle $e$ is then set into the next hole $e^2$ in the top plate of the casing. In this position of the rear part A' the teeth of the actuating-wheels H are in a position so that they can mesh with the spur-wheels on the sides of the numbering-wheels D, as seen in Figs. 6 and 7. In this position of the actuating-wheels the driving-wheel G can be rotated in only one direction, being prevented from rotating in the opposite direction by the toothed segments meshing with the spur-wheels $d$ and the spring check-pawls of the numbering-wheels. When the rear part A' is moved back again, so that the actuating-wheels H are out of gear with the spur-wheels $d$, and when the cover $A^4$ is laterally shifted, so that the gear-wheel $g^4$ is out of mesh with the gear-wheel $g^3$ on shaft $s^3$, then the driving-wheel G is free to turn in either direction.

In Fig. 2 the position of the actuating-wheels is shown before the shifting of the rear part, while in Figs. 6 and 7 the actuating-wheels are shown in shifted position, so that the teeth of the same can mesh with the corresponding units, tens, hundreds, thousands, &c., numbering-wheels. As each actuating-wheel H is provided with nine teeth, it is necessary to shift the relative position of the actuating-wheels toward their axis $s^2$ in such a manner that only one wheel at a time can engage with the numbering-wheels. This relative position of the teeth of the actuating-wheels on the shaft $s^2$ is shown clearly in Fig. 5 and in part in Fig. 6. One full rotation of the shaft $s^2$, however, will produce the meshing of the teeth of all the actuating-wheels arranged on said shaft.

The cover $A^4$, with the indicating-disks, can be readily moved sidewise, so as to give access to the actuating-wheels H and their pivoted teeth, as shown in Fig. 3. The finger of the operator can then readily throw up as many teeth as are required and place them in radial position toward the body of the disk or return them into lateral position thereon. In either position the teeth are held by the springs acting on the heels of the teeth, so that they cannot shift from one position to the other during the time when the wheels are in motion. After the required number of teeth are set radially in line with the body of the actuating-wheels the cover $A^4$ is returned into closed position, so that the bevel-wheel $g^4$ meshes with the bevel-wheel $g^3$ on the actuating-shaft $s^2$, as shown in Fig. 8. The rear part A' is then shifted forward into mesh with the spur-wheels $d$ of the numbering-wheels D, whereby the machine is ready either for multiplication or division, as the case may be. On the movable rear part are arranged, so as to move therewith, the driving gear-wheel G and pinion G', the signal-bell $G^3$, the actuating-wheels H and their shaft, and the indicating-disks W, all of which parts are necessary in the last-mentioned arithmetical operations, while for performing addition and subtraction these parts are shifted out of mesh with the numbering-wheels, as these last two operations are performed by the depression of the keys, key-levers, actuating mechanism, and the carrying mechanism.

It is obvious that in performing addition and subtraction the numbers may be set up either from the left toward the right or from the right toward the left or in any other manner by depressing the key-levers according to the figures in the columns one below the other. In all cases it is necessary that one key-lever only at a time should be depressed, except when it happens that a number of nines are shown adjacent to each other on the numbering-wheels, as in "999," in which case the operation of the carrying mechanisms may be assisted and rendered absolutely reliable by depressing the keys numbered "1" in the units, tens, and hundreds columns of keys. This produces the carrying of the adjacent numbering-wheels without relying solely on the carrying mechanism. A stop-pin $m$ is arranged at the left-hand side of the casing A, which when pushed in is placed in the path of the pins $p$ of the last numbering-wheel of the machine, said pin serving to stop all the numbering-wheels, or, in other words, the entire mechanism, when the highest number that can be set off on the machine is reached, so that the machine cannot be operated beyond its full capacity. By stopping the numbering-wheels it indicates that the extreme limit within which the machine can be worked has been reached.

Operation: The different arithmetical operations are performed in the following manner:

Addition: For adding the index is first set to the letter "A," the transverse bar B being then pushed down as far as it can be depressed, so as to move all the numbering-wheels forward to zero, the zero-points appearing in the apertures of the sliding face-plate F, which, as well as the index of the eccentric, have been set to "A." The figures of the numbers to be added are then set up successively by means of the keys, either from right to left, or in columns, or from left to right, as desired, the keys being fully depressed, so that each key produces the turning of the numbering-wheels, and thereby the required addition. If, for instance, the numbers three hundred and forty-five, seventy-two, and four thousand and four are to be added, the keys of the corresponding figures are depressed, so that finally the sum "4421" appears in the apertures of the face-plate, while the remaining ten-thousands and hundred-thousands wheels have not turned at all and are still at zero. When the operation of addition is completed, the transverse bar B is again pushed down, so that all the numbering-wheels are returned to zero and ready for the next addition.

Subtraction: For subtraction the face-plate is set by its knob and index to the letter "S," and all the numbering-wheels are moved forward to zero by the transverse bar B in the manner described. In this case the apertures of the face-plate F are not located above the zero-points, but above the figures "9." The numbers to be subtracted have to be set up, the best way to do this being by starting with the units-wheel and going up to the higher numbering-wheels in regular order. If the number to be subtracted from is "425," this number is first set up on the numbering-wheels either by depressing the key numbered "1" of the units-row four times in succession until the figure "5" appears on the units numbering-wheel or depressing the units-key numbered "4," so that the figure "5" appears directly on the units numbering-wheel. This same operation is carried on on the tens and hundreds wheels until the number "425" appears in the apertures o of the face-plate. The figures of the subtrahend are next set up on the numbering-wheels by depressing the correspondingly-numbered keys, so that the difference between the minuend and subtrahend appears directly on the numbering-wheels in the apertures of the face-plate.

Multiplication: In multiplication the key-levers and transmitting mechanisms, as before stated, are not used; but the shifting-strap $A^3$ is moved forward and by the knob $e'$ of the eccentric E the index I placed to the letter "M" on the casing. Before this is done the indicating-disks W, W', $W^2$, and $W^3$ are set to zero, which is accomplished by turning the handles attached to their center pivots. The required number of teeth on the actuating-wheels H, corresponding to the separate figures of the multiplicand, are likewise set into radial position before the sliding cover is returned into its closed position. The numbering-wheels D must also be returned to zero. Supposing two hundred and thirty-five is to be multiplied by forty-five, the larger number is set off on the actuating-wheels H, which is done by setting a number of teeth corresponding to the number "5" into radial position on the body of the units actuating-wheel, three teeth on the tens actuating-wheel, and two on the hundreds actuating-wheel, while the teeth of the remaining actuating-wheels remain in position at right angles to the body of the wheels. The driving gear-wheel G is then turned long enough so that the pinion G' and the shaft $s^2$ make forty-five rotations. These can either be counted off by counting the strokes of the bell or the turning is continued until the figures "4" and "5" appear, respectively, on the units and tens indicating disks W W'. The result of this operation is then shown on the numbering-wheels, on which the number "10575" appears.

Division: For performing division the divisor is set off on the indicating-wheels W, while the dividend is set off on the numbering-wheels D. The driving gear-wheel is then turned until gradually the number appearing on the numbering-wheels is reduced to a number which is less than the divisor, which incates the remainder left after dividing, and the figures on the indicating-disks W indicate the quotient.

The advantages of my improved calculating-machine are that even the unskilled can perform all the different arithmetical operations with great facility and with little practice in a very reliable manner, so that the machine is adapted for use in all classes and trades. It can be manufactured at a comparatively small price and is, owing to the simple and effective construction of the carrying mechanism between the numbering-wheels and the comparatively simple construction of the actuating-wheels and indicating-disks, subjected to comparatively small wear and repairs.

Having thus described my invention, I claim as new and desire to secure by Letters Patent—

1. The combination of a series of actuating-keys arranged in rows or groups, a shaft, key-levers mounted at their inner ends on said shaft, and extending along and in contact with the under side of the top part of the casing, and adapted to be depressed by said keys, said key-levers each consisting of a short section connected with the shaft, and a longer section pivoted to said short section, said sections being provided at their adjacent pivoted ends with stop-shoulders which abut when the sections of the levers are in line with each other, toothed segments applied to the short sections of said key-levers at opposite sides of the fulcrums of the same, a series of numbering-wheels, and carrying mechanism arranged between each numbering-wheel and the key-lever of the next higher numbering-wheel, substantially as set forth.

2. The combination of a series of keys arranged in rows or groups, fulcrumed key-levers, one for each line of keys, toothed and spring-actuated segments applied to said key-levers, numbering-wheels, a spur-wheel at one side of each numbering-wheel, stop-pins at the other side of the same, upwardly-extending angular pins arranged on the next adjacent key-levers, fulcrumed levers between the stop-pins and angular pins for transmitting motion from one numbering-wheel to the next adjacent key-lever for carrying over to the next adjacent numbering-wheel, substantially as set forth.

3. The combination, with a transverse vertically-reciprocating push-bar provided with as many pivoted and spring-actuated pushers as there are key-levers, fulcrumed key-levers before said pushers provided with toothed segments, numbering-wheels provided with spur-wheels engaged by said segments, stop-pins at the opposite side of said numbering-wheels, horizontally-guided fingers adapted to engage said stop-pins, and mechanism between said stop-pins and the reciprocating bar, whereby, by the depression of the bar, all the numbering-wheels are moved forward to their initial position, substantially as set forth.

4. The combination, with a number of fulcrumed key-levers, toothed segments applied to the inner ends of said key-levers, a transverse and vertically-reciprocating push-bar provided with pivoted and spring-actuating pushers, numbering-wheels having spur-wheels at one side for meshing with the teeth of the segments and stop-pins projecting from the opposite side, a horizontally-reciprocating arresting-finger for engaging one of said stop-pins, means for guiding said stop-finger, and mechanism between the push-bar and base of the arresting-finger, whereby the latter is moved forward into engagement with one of the stop-pins, while the pushers move the numbering-wheels forward to their initial positions, substantially as set forth.

5. In a calculating-machine, the combination of a series of numbering-wheels, provided on their circumference with two rows of units figures arranged in opposite directions to each other, a casing inclosing said numbering-wheels and provided with openings above the figures on said wheels, and having arithmetical indications on its top plate, a laterally-shiftable face-plate having openings through which the figures on the numbering-wheels can be seen, said slide having a transversely-extending slot, means for guiding said face-plate, means for shifting said face-plate so that its openings are placed over one or the other of the rows of figures on the numbering-wheels as required for addition or subtraction, such shifting means consisting of a spindle provided with an eccentric located in said slot and a knob for turning the spindle, and an index operated by said shifting means to point to either of said indications, substantially as set forth.

6. In a calculating-machine, the combination of the main casing, provided with an adjustable rear part, numbering-wheels arranged on said casing, said numbering-wheels being provided on their circumference with two rows of figures, a face-plate having openings for the figures on the numbering-wheels, a connecting-strap between the front and rear parts of the same, an eccentric for shifting the face-plate, and means for locking the connecting-strap and rear part of the casing in position relatively to the front part and numbering-wheels, substantially as set forth.

7. In a calculating-machine, the combination of a series of numbering-wheels provided on their circumferences with two rows of figures arranged in opposite directions to each other, spur-wheels on said numbering-wheels, actuating-wheels each provided with a group of pivoted and spring-locked teeth adapted to be placed in or out of mesh with the spur-wheels, means for rotating said actuating-wheels and means for indicating the number of rotations of said actuating-wheels, substantially as set forth.

8. In a calculating-machine, the combination of a series of numbering-wheels, provided on their circumference with two rows of figures arranged in opposite direction to each other, spur-wheels on said numbering-wheels, actuating-wheels each provided with a group of pivoted and spring-locked teeth adapted to be placed into radial position to the body of the wheels or at right angles thereto, means for shifting the actuating-wheels in or out of mesh with the numbering-wheels, means for rotating said actuating-wheels, and means for indicating the number of rotations of said actuating-wheels, substantially as set forth.

9. The combination, in a calculating-machine, of a casing having a movable rear part, a series of numbering-wheels, spur-wheels on said numbering-wheels, a rotary shaft arranged in the rear part of the casing, actuating-wheels provided with a number of teeth pivoted to said wheels and adapted to mesh with the spur-wheels of the numbering-wheels, means for adjusting the rear part of the casing in forward or backward direction, and driving mechanism by which rotary motion is transmitted to the actuating-wheels, substantially as set forth.

10. In a calculating-machine, the combination, with a series of numbering-wheels provided at their circumferences with two rows of figures arranged in opposite direction to each other, spur-wheels arranged on each numbering-wheel, actuating-wheels arranged in line with said spur-wheels and provided with a series of pivoted and spring-locked teeth, a shaft on which said actuating-wheels are keyed and driving mechanism by which rotary motion is imparted to said actuating-wheels, substantially as set forth.

11. The combination with a series of numbering-wheels provided at their circumferences with two rows of figures running in opposite direction to each other, spur-wheels on said numbering-wheels, a rotary shaft arranged to the rear of said numbering-wheels, means for adjusting said shaft toward or away from said numbering-wheels, actuating-wheels on said shaft provided with pivoted and spring-locked teeth adapted to mesh with said spur-wheels, driving gear-wheels for transmitting rotary motion to said actuating-wheels, a series of indicating-disks, and means connecting the driving-gear with said indicating-disks, so as to actuate them in connection with the shaft in performing multiplication or division, substantially as set forth.

12. The combination, of a casing, a series of numbering-wheels arranged in the front part of the casing, spur-wheels on said numbering-wheels, a movable rear part of the casing, means for adjusting the rear part of the casing in forward and backward direction, a shaft supported in said rear part, actuating-wheels located on said shaft and provided with adjustable teeth in line with the spur-wheels of the numbering-wheels, a driving-gear for rotating the shaft of the actuating-wheels, a face-plate having openings above the figures on the upper part of the numbering-wheels, a strap for connecting the rear part of the casing with holes in the front part of the same, and means for laterally shifting the face-plate, so as to set the same for multiplication or division, substantially as set forth.

13. In a calculating-machine, a series of actuating-wheels provided with pivoted teeth, springs for acting on the heels of said teeth so as to permit any number of them to be adjusted radially to the body of the wheels or set at right angles thereto, substantially as set forth.

In testimony that I claim the foregoing as my invention I have signed my name in presence of two subscribing witnesses.

GUSTAV ZEIDLER.

Witnesses:
PAUL GOEPEL,
K. R. BRENNAN.